United States Patent
Warno

(10) Patent No.: US 9,384,030 B2
(45) Date of Patent: Jul. 5, 2016

(54) SYSTEM AND METHOD FOR DEPLOYING A DYNAMIC VIRTUAL NETWORK ADDRESS TRANSLATION APPLIANCE

(75) Inventor: Keith Richard Warno, Mastic Beach, NY (US)

(73) Assignee: CA, Inc., New York, NY (US)

(*) Notice: Subject to any disclaimer, the term of this patent is extended or adjusted under 35 U.S.C. 154(b) by 926 days.

(21) Appl. No.: 13/207,813

(22) Filed: Aug. 11, 2011

(65) Prior Publication Data

US 2013/0041987 A1 Feb. 14, 2013

(51) Int. Cl.
G06F 15/177 (2006.01)
G06F 9/455 (2006.01)
H04L 29/12 (2006.01)

(52) U.S. Cl.
CPC ........ *G06F 9/45558* (2013.01); *H04L 61/2514* (2013.01); *H04L 61/2535* (2013.01); *G06F 2009/45562* (2013.01)

(58) Field of Classification Search
CPC . H04L 61/2514; H04L 12/4641; H04L 49/70; H04L 49/00; H04L 45/04; H04L 45/745
USPC .......................................................... 709/220
See application file for complete search history.

(56) References Cited

U.S. PATENT DOCUMENTS

| | | | |
|---|---|---|---|
| 6,608,830 B1 * | 8/2003 | Hirano et al. ............... | 370/351 |
| 7,228,337 B1 | 6/2007 | Bornstein et al. | |
| 7,769,004 B2 | 8/2010 | Johnson et al. | |
| 7,802,000 B1 | 9/2010 | Huang et al. | |
| 7,840,701 B2 | 11/2010 | Hsu et al. | |
| 7,886,021 B2 | 2/2011 | Scheiffer et al. | |
| 7,920,549 B2 | 4/2011 | Alt et al. | |
| 7,921,197 B2 | 4/2011 | Soundararajan | |
| 2007/0027964 A1 | 2/2007 | Herrod et al. | |
| 2007/0101323 A1 * | 5/2007 | Foley et al. ................ | 718/1 |
| 2009/0150885 A1 | 6/2009 | Safari et al. | |
| 2009/0241108 A1 | 9/2009 | Edwards et al. | |
| 2009/0288084 A1 * | 11/2009 | Astete et al. ............... | 718/1 |
| 2009/0313690 A1 | 12/2009 | Bichot et al. | |
| 2010/0027552 A1 | 2/2010 | Hill | |
| 2010/0115080 A1 | 5/2010 | Kageyama | |
| 2010/0217837 A1 | 8/2010 | Ansari et al. | |
| 2010/0235539 A1 | 9/2010 | Carter et al. | |
| 2010/0235831 A1 | 9/2010 | Dittmer | |
| 2010/0287548 A1 * | 11/2010 | Zhou et al. ................. | 718/1 |

(Continued)

OTHER PUBLICATIONS

Alexander Samoilenko, "Virtualization: Secure Virtual User Environments in VMware ACE," Sep. 14, 2007.

(Continued)

*Primary Examiner* — Jerry Dennison
(74) *Attorney, Agent, or Firm* — Baker Botts L.L.P.

(57) ABSTRACT

According to one embodiment of the present disclosure, a method for deploying a virtual network address translation (NAT) appliance includes receiving a request to generate a virtual machine environment. The method also includes generating the virtual machine environment from an environment template, the virtual machine environment comprising a first virtual machine. The method further includes configuring a hostname for a virtual NAT appliance instance, and configuring one or more private network settings for the virtual NAT appliance instance. The method also includes generating the virtual NAT appliance instance from the NAT appliance template, the NAT appliance instance comprising a public network interface and a private network interface.

24 Claims, 4 Drawing Sheets

(56) References Cited

U.S. PATENT DOCUMENTS

| | | |
|---|---|---|
| 2011/0022695 A1 | 1/2011 | Dalal et al. |
| 2011/0107331 A1 | 5/2011 | Evans et al. |
| 2013/0041987 A1* | 2/2013 | Warno ................ H04L 61/2535 709/220 |
| 2015/0301847 A1* | 10/2015 | Silva ................... G06F 9/45558 718/1 |

OTHER PUBLICATIONS

Wenjie Liu et al., "On an Automatic Simulation Environment Customizing Services for Cloud Simulation Center," 2010 Fifth IEEE International Symposium on Service Oriented System Engineering, © 2010 IEEE, Aug. 10, 2010.

* cited by examiner

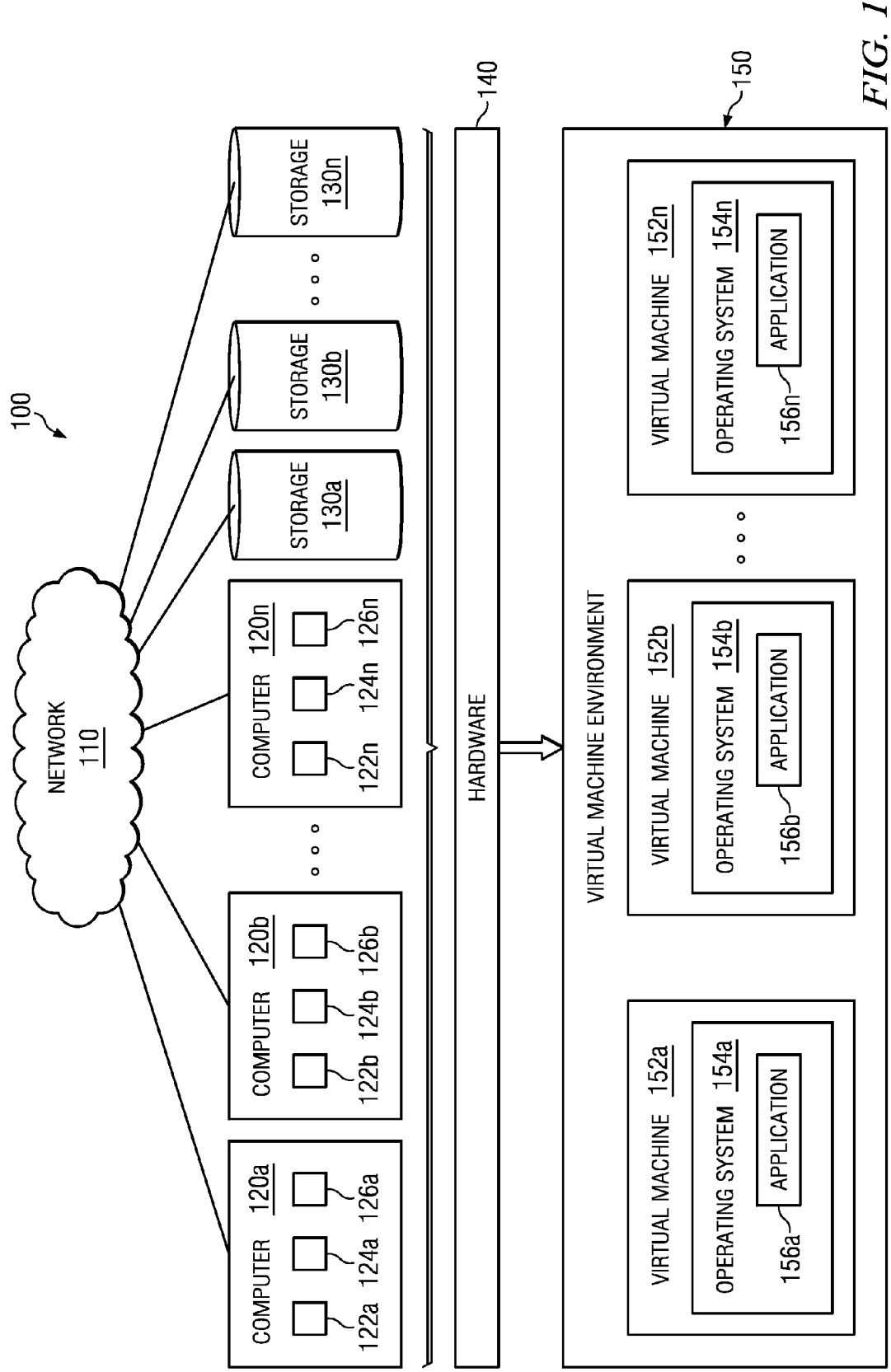

SYSTEM AND METHOD FOR DEPLOYING A DYNAMIC VIRTUAL NETWORK ADDRESS TRANSLATION APPLIANCE

TECHNICAL FIELD

The present disclosure relates generally to a virtual network address translation (NAT) appliance and more particularly to a system and method for providing a dynamically configurable and deployable virtual NAT appliance suitable for cloning virtual machine environments on a network.

BACKGROUND

Virtual machine environments comprise a plurality of virtual machines. Sometimes, a user may wish to clone a virtual machine environment on a network from an environment template comprising pre-configured virtual machine images. In existing systems, cloning such an environment may lead to problems such as multiple virtual machines on a network with the same hostname and/or network address.

SUMMARY

According to one embodiment of the present disclosure, a method for deploying a virtual network address translation (NAT) appliance includes receiving a request to generate a virtual machine environment. The method also includes generating the virtual machine environment from an environment template, the virtual machine environment comprising a first virtual machine. The method further includes configuring a hostname for a virtual NAT appliance instance, and configuring one or more private network settings for the virtual NAT appliance instance. The method also includes generating the virtual NAT appliance instance from the NAT appliance template, the NAT appliance instance comprising a public network interface and a private network interface.

Particular embodiments of the present disclosure may allow the virtual NAT appliance to provide network services to the virtual machine environment. Further embodiments may allow for the virtual NAT appliance to provide network services such as dynamic host configuration protocol (DHCP) services, domain name system (DNS) services, and/or virtual private network (VPN) services.

Technical advantages of the present disclosure include the ability to clone a virtual machine environment on a network without time consuming customization and configuration of individual virtual machines within the virtual machine environment. Particular embodiments of the present disclosure may allow for the virtual NAT appliance to be dynamically deployed and configured for any virtual machine environment. Certain embodiments of the present disclosure may also allow for the virtual NAT appliance to be deployed logically between the virtual machine environment and the rest of the network to provide network isolation for the virtual machine environment.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following descriptions, taken in conjunction with the accompanying drawings, in which:

FIG. 1 illustrates system that includes an network, a master server, and a replica server;

DETAILED DESCRIPTION OF EXAMPLE EMBODIMENTS

Figure 2A:
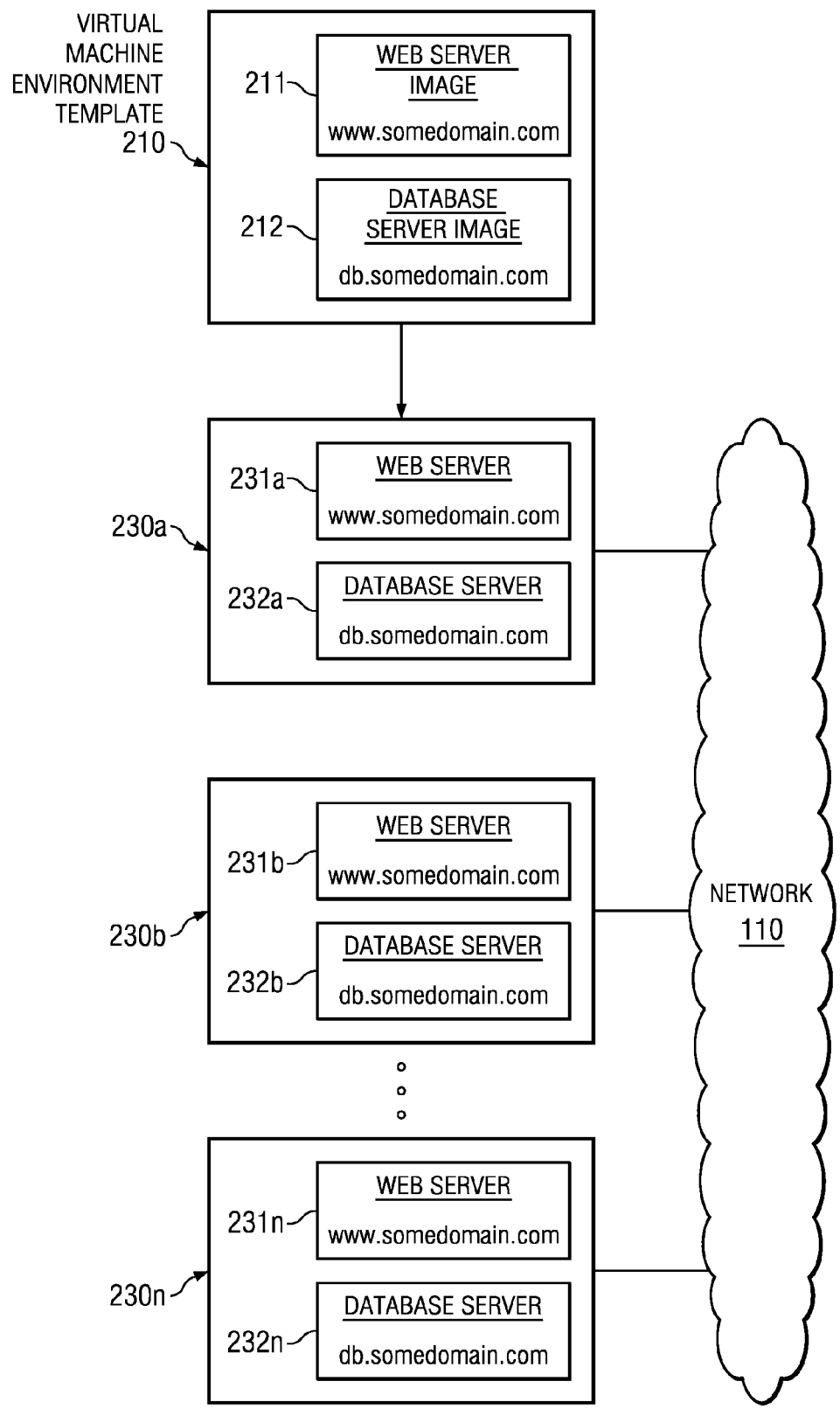
FIG. 2A illustrates multiple instances of virtual machine environments cloned from an environment template on a network.
Figure 2B:
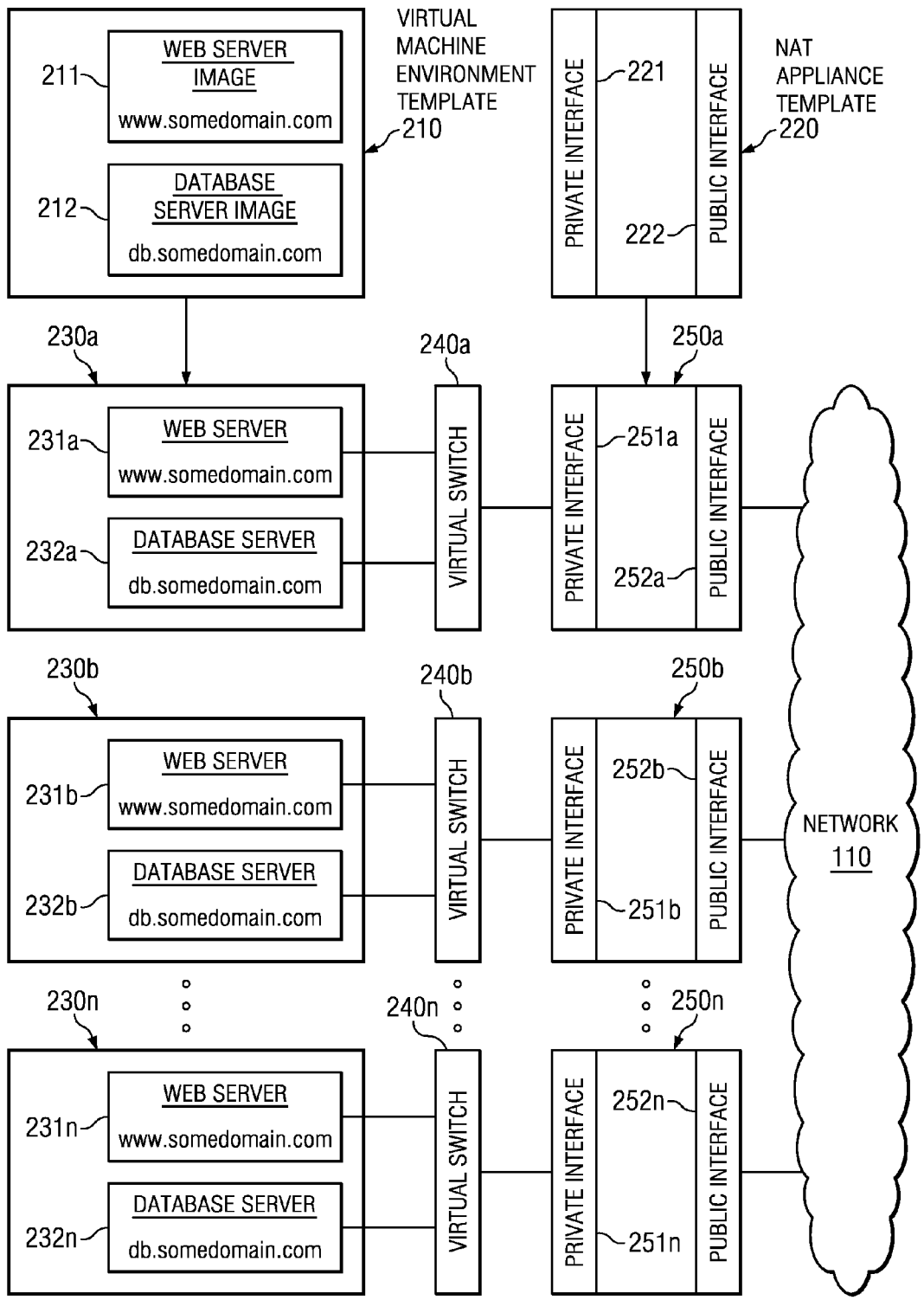
FIG. 2B illustrates multiple instances of virtual machine environments cloned from an environment template and multiple instances of NAT appliances cloned from a NAT appliance template on a network.
Figure 3:
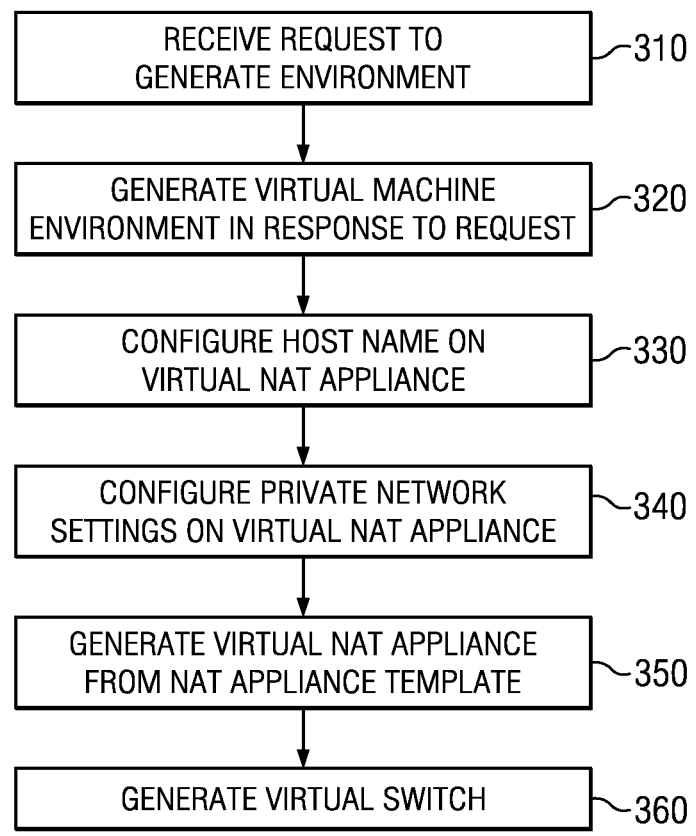
FIG. 3 illustrates an example method for deploying instances of a NAT appliance template.

Embodiments of the present disclosure and its advantages are best understood by referring to FIGS. 1 through 3 of the drawings, like numerals being used for like and corresponding parts of the various drawings.

FIG. 1 illustrates a system 100 that includes a virtual machine environment 150 running on shared hardware 140, and may embody aspects of the present disclosure. In particular embodiments, system 100 may be used to provide a virtual appliance virtual machine that is configured to provide network address translation (NAT) services to a network or sub-network. In certain embodiments, the virtual NAT appliance may be suitable for virtual machine environment cloning, deployment, and/or provisioning.

In an enterprise-class virtual infrastructure, it is possible to automate the deployment and/or provisioning of individual virtual machines by cloning pre-configured virtual machine images. Clones or instances of virtual machine images are normally customized and/or configured during deployment, usually with a new hostname and administrative password. After deployment, the virtual machine instances are directly accessible by the end-user via the network to which the virtual machine was deployed. Often, however, there is a need to setup an entire virtual machine environment in a clean, known state. To fulfill this need, one may replicate or clone entire pre-configured groups of virtual machines called environment templates.

However, while the process described above may successfully deploy a single virtual machine instance (where the customization process has no effect on the operation of software on the virtual machine), problems may arise in the context of cloning entire virtual machine environments. This is because the operation of each virtual machine in the virtual machine environment depends on the other virtual machines in that environment. Thus, in order to ensure proper interaction and communication between the virtual machines in the cloned virtual machine environment, each virtual machine image in an environment template would need to be cloned as-is without any customization or configuration. If the environment were cloned and deployed on the network more than once, however, issues would then arise due to the duplicate hostnames and/or network addresses assigned to the virtual machines in the environment template. Time consuming customization and configuration for each virtual machine image in the environment template would therefore be required to avoid these issues.

At least one aspect of the present disclosure provides a solution to these issues. In accordance with at least one embodiment of the present disclosure, a virtual NAT appliance may be deployed logically between the virtual machine environment and the network to provide network isolation for the environment, allowing the environment to be cloned multiple times without customization. In particular embodiments, the virtual NAT appliance may be based on a NAT appliance template or image. In further embodiments, the NAT appliance template may be dynamically configured and deployed for any virtual machine environment, regardless of the size or complexity of that environment. In some embodiments, the virtual NAT appliance may provide services to a virtual machine environment such as dynamic host configuration protocol (DHCP) services, domain name system (DNS) services, and/or virtual private network (VPN) services.

System 100 may utilize hardware virtualization techniques to run one or more virtual machines 152 inside one or more virtual machine environments 150. Hardware virtualization may refer to the abstraction of computer hardware resources, allowing for the sharing of the underlying resources between the one or more virtual machines. Shared hardware 140 may run virtualization software operable to create a virtual environment 150. Examples of virtualization software include VMware vSphere, VMware ESX, and Microsoft Hyper-V. Virtual environment 150 may run on shared hardware 140, which includes a network 110, one or more computer systems 120, and storage 130. In some embodiments, virtual environment 150 may run on a plurality of computer systems 130 in shared hardware 140. In other embodiments, virtual environment may run on a singe computer system 130 in shared hardware 140.

Virtual machine environment 150 may be operable to run one or more virtual machines 152. A virtual machine may refer to the software implementation of a physical machine, wherein the virtual machine may provide computer functionality and execute an operating system and one or more software programs. For example, virtual machines 152 may run operating systems such as Microsoft Windows, Linux, and Mac OS. In addition to running operating system 154, virtual machines 152 may run one or more software applications 156, programs, modules, and/or other logic that may be encoded in one or more tangible computer-readable media and may perform operations when executed by processor 122. In certain embodiments, virtual machines 152 may be virtual appliance virtual machines.

Network 110 may refer to any interconnecting system capable of transmitting audio, video, signals, data, messages, or any combination of the preceding. Network 110 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise internet, or any other suitable communication link, including combinations thereof. Network 110 may connect a plurality of computer systems 120.

Computer system 120 includes a processor 122, memory 124, and an interface 126. Processor 122 may refer to any suitable device operable to execute instructions and manipulate data to perform operations for computer system 120. Processor 122 may include, for example, any type of central processing unit (CPU).

Memory 124 stores information and may comprise one or more tangible, computer-readable, and/or computer-executable computer readable medium, and may exclude signals or carrier waves. Examples of memory include computer memory (for example, Random Access Memory (RAM) or Read Only Memory (ROM)), mass computer readable media (for example, a hard disk), removable computer readable media (for example, a Compact Disk (CD) or a Digital Video Disk (DVD)), and/or other computer-readable medium.

Interface 126 may refer to any suitable device operable to receive input for computer system 120, send output from computer system 120, perform suitable processing of the input or output or both, communicate to other devices, or any combination of the preceding. Interface 126 may include appropriate hardware (e.g. modem, network interface card, etc.) and software, including protocol conversion and data processing capabilities, to communicate through a LAN, WAN, or other communication system that allows computer system 120 to communicate to other devices. Interface 126 may include one or more ports, conversion software, or both.

Storage 130 may provide additional data storage capacity and may include database and/or network storage (for example, a server), or any other suitable tangible, computer-readable storage media. In certain embodiments, storage 130 may include network resources, such as one or more storage area networks (SAN) or network-attached storage (NAS).

FIG. 2A illustrates multiple instances of virtual machine environments 230 cloned from an environment template 210 on a network 110. Virtual environments 230 may be cloned from an environment template 210. Environment template 210 may comprise one or more virtual machine images. For example, and not by way of limitation, an environment template 210 may comprise a web server image 211 and a database server image 212 as shown in FIG. 2A. Web server image 211 may have a hostname such as www.somedomain.com, while database server image 212 may have a hostname such as db.somedomain.com. In such a system, if a user wished to clone an environment template more than once on network 110, each virtual machine image in the virtual machine environment would require customization or configuration before deployment in order to avoid hostname and/or network address conflicts on the network.

Referring to FIG. 2A, if environment template 210 were cloned on network 110 without customization of each virtual machine image in environment template 210, multiple instances of web server 231 with hostname www.somedomain.com would exist on network 110. Similarly, multiple instances of database server 232 with hostname db.somedomain.com would exist on network 110. Furthermore, each instance of web server 231 and database server 232 may have the same network address. This may lead to hostname and/or network address collisions on network 110. In order to avoid these issues, one would need to customize each virtual machine in the environment before deployment and provide each virtual machine with a separate and unique hostname and network address. However, this may not be feasible if the range of available network addresses on network 110 is limited. At least one aspect of the present disclosure provides a solution to these issues, and allows for repeated cloning of environment templates and deployment of virtual machine environment instances without customization of each virtual machine instance within the virtual machine environment. Rather, all that may be required is the configuration of a NAT appliance template.

FIG. 2B illustrates multiple instances of virtual machine environments 230 cloned from an environment template 210 and multiple instances of NAT appliances 250 cloned from a NAT appliance template 220 on a network 110. In particular embodiments of the present disclosure, virtual machine environment instances 230 may be cloned, deployed, and generated from an environment template 210 which may comprise one or more virtual machine images. For example, and not by way of limitation, environment template 210 may comprise a web server image 211 and a database server image 212. In certain embodiments, environment template 210 may be cloned multiple times on network 110 as shown in FIG. 2B, resulting in any number of virtual machine environments 230, each virtual machine environment comprising one or more virtual machine instances created from the virtual machine images within environment template 210. For example, and not by way of limitation, each environment 230 may comprise a web server 231 with hostname such as www.somedomain.com and generated from virtual machine image 211 in environment template 210. Similarly, each environment 230 may comprise a database server 232 with hostname such as db.somedomain.com and generated from virtual machine image 212 in environment template 210.

In particular embodiments, NAT appliance instances 250 may be cloned from NAT appliance template 220 and deployed or generated in system 100. In some embodiments, a NAT appliance instance 250 may be deployed for each virtual machine environment instance 230 in network 110, with each NAT appliance 250 hosting a virtual machine environment instance 230. In further embodiments, each NAT appliance instance 250 may be customized or configured prior to deployment on network 110. For example, and not by way of limitation, each NAT appliance instance may be given a unique hostname and/or may be configured with private network settings. Such private network settings may include providing certain services such as DNS, DHCP, and/or VPN to a virtual machine environment.

Each NAT appliance instance 250 may comprise a public interface 221 operable to communicate with network 110, and a private interface 222 operable to communicate with an environment 230. In certain embodiments, private interface 222 may be operable to communicate with an environment 230 through a virtual switch 240, which may be deployed logically between each NAT appliance instance 250 and virtual machine environment instance 230. By configuring and generating a NAT appliance instance for each virtual machine environment instance on the network, customization and configuration of each virtual machine in the virtual machine environment is avoided. Moreover, the use of a NAT appliance instance for each virtual machine environment instance allows for the virtual machine environment to be network-isolated on its own private network, which in turn allows for less usage of available network addresses on network 110.

In particular embodiments, a NAT appliance instance 250 may run on a 32-bit based operating system, such as Linux. In further embodiments, the NAT appliance instance 250 may be based on a vanilla, or non-patched, Linux kernel that has been configured to provide network address translation. Some embodiments of the NAT appliance instance 250 may include only a minimum amount of packages necessary to perform essential functions. For example, and not by way of limitation, NAT appliance instance 250 may include packages designed specifically for small, embedded systems such as uClibc (C library) and/or BusyBox (UNIX utilities). Other embodiments may also include packages for providing network services. For instance, NAT appliance instance may include Linux packages such as dnsmasq for providing DNS and/or DHCP services, pptpd and PPP for providing VPN services, and OpenSSH and OpenSSL for providing SSH services. Further embodiments may also include a package for providing and/or configuring private network settings on the NAT appliance instance.

FIG. 3 illustrates an example method for deploying instances of a NAT appliance template according to the present disclosure. The method begins at step 310, where system 100 receives a request to clone a virtual machine environment. In particular embodiments, the request may indicate that the virtual machine environment be cloned from an environment template. In certain embodiments, the request may be provided by a system administrator. In other embodiments, the request may be generated by a automation software.

At step 320, system 100 generates the virtual machine environment in response to the request received. The virtual machine environment may comprise any number of virtual machine instances. In particular embodiments, the virtual machine environment may be generated from an environment template, wherein the environment template may comprise any number of virtual machine images. In such embodiments, the number of virtual machine instances generated may depend on the number of virtual machine images in the environment template. In further embodiments, the virtual machine instances may be given hostnames, network addresses, and/or any other suitable settings or configurations based on the virtual machine images in the environment template.

At step 330, a hostname is configured for the virtual NAT appliance. In particular embodiments, the hostname may be configured by a system administrator. In other embodiments, the hostname may be configured by automation software. At step 340, private network settings are configured for the virtual NAT appliance. In particular embodiments, the private network settings may be configured by a system administrator. In other embodiments, the private network settings may be configured by automation software. In particular embodiments, configuring private network settings on the virtual NAT appliance may include configuring host configuration services to be provided to virtual machines in the virtual machine environment. In some embodiments, the host configuration services may include DHCP services. In some embodiments, configuring private network settings on the virtual NAT appliance may include configuring a VPN service to be provided to virtual machines in the virtual machine environment. In some embodiments, configuring private network settings for the virtual NAT appliance may include applying one or more port forwarding rules. In some embodiments, configuring private network settings for the virtual NAT appliance may include configuring one or more firewall rules.

At step 350, system 100 generates a virtual NAT appliance. In certain embodiments, the NAT appliance may include a public network interface and a private network interface. In such embodiments, the public network interface may be operable to communicate with a public network such as network 110 shown in FIG. 2B, and the private network interface may be operable to communicate with the one or more virtual machines in the virtual machine environment. In particular embodiments, the virtual NAT appliance may be deployed logically between the network and the virtual machine environment, providing network isolation for the virtual machine environment. In certain embodiments, the virtual NAT appliance may provide network address translation between public network addresses and network addresses in the virtual machine environment. In further embodiments, the virtual NAT appliance may be operable to provide services such as DNS, DHCP, VPN, or any other suitable network service to the virtual machine environment.

At step 360, system 100 generates a virtual switch. A virtual switch may refer to a software implementation of a physical network switch, wherein the virtual switch may provide Layer 2 network packet forwarding on a network. In particular embodiments, the virtual switch may be operable to facilitate communication between virtual machine instances in a virtual machine environment. In certain embodiments, the virtual switch may be deployed logically between a virtual machine environment and a NAT appliance. In further embodiments, the virtual switch may be operable to facilitate communication between the private network interface of a NAT appliance and a virtual machine environment.

Although the present disclosure has been described in several embodiments, a myriad of changes, substitutions, and modifications may be suggested to one skilled in the art, and it is intended that the present disclosure encompass such changes, substitutions, and modifications as fall within the scope of the present appended claims.

What is claimed:

1. A method comprising:
    receiving a first request to generate a first virtual machine environment;
    generating the first virtual machine environment by cloning an environment template, the environment template comprising a first plurality of virtual machines comprising a web server image and a database server image;
    receiving a second request to generate a second virtual machine environment;
    generating the second virtual machine environment by cloning the environment template;
    wherein the environment template, the first virtual machine environment and the second virtual machine environment each comprise a common hostname;
    configuring first and second hostnames different from the common hostname for first and second virtual network address translation (NAT) appliance instances, respectively;
    configuring first and second private network settings for the first and second virtual NAT appliance instances, respectively;
    generating the first and second virtual NAT appliance instances from a NAT appliance template, the NAT appliance template comprising a public network interface and a private network interface;
    logically deploying the first virtual NAT appliance instance between the first virtual machine environment and a network; and
    logically deploying the second virtual NAT appliance instance between the second virtual machine environment and the network.

2. The method of claim 1, further comprising generating a virtual switch, the virtual switch operable to facilitate communication between the first plurality of virtual machines and the first private network interface.

3. The method of claim 1, wherein configuring the first and second private network settings for the first and second NAT appliance instances comprises configuring services on the first and second NAT appliance instances operable to provide host configuration services.

4. The method of claim 3, wherein the host configuration services comprise domain name system (DNS) and dynamic host configuration protocol (DHCP) services.

5. The method of claim 1, wherein configuring the first and second private network settings for the first and second NAT appliance instances comprises configuring virtual private network (VPN) services.

6. The method of claim 1, wherein configuring the first and second private network settings for the first and second NAT appliance instances comprises applying port forwarding rules.

7. The method of claim 1, wherein configuring the first and second private network settings for the first and second NAT appliance instances comprises configuring firewall rules.

8. The method of claim 1, further comprising:
    receiving an address from a host configuration server on the network; and
    assigning the address to the public network interface of one of the first and second NAT appliance instances generated from the NAT appliance template.

9. A system, comprising:
    one or more processors operable to:
        receive a first request to generate a first virtual machine environment;
        generate the first virtual machine environment by cloning an environment template, the environment template comprising a first plurality of virtual machines comprising a web server image and a database server image;
        receive a second request to generate a second virtual machine environment;
        generate the second virtual machine environment by cloning the environment template;
        wherein the environment template, the first virtual machine environment and the second virtual machine environment each comprise a common hostname;
        configure first and second hostnames different from the common hostname for first and second virtual NAT appliance instances, respectively;
        configure first and second private network settings for the first and second virtual NAT appliance instances, respectively;
        generate the first and second virtual NAT appliance instances from a NAT appliance template, the NAT appliance template comprising a public network interface and a private network interface;
        logically deploy the first virtual NAT appliance between the first virtual machine environment and a network; and
        logically deploy the second virtual NAT appliance between the second virtual machine environment and the network.

10. The system of claim 9, the one or more processors being further operable to generate a virtual switch, the virtual switch operable to facilitate communication between the first plurality of virtual machines and the first private network interface.

11. The system of claim 9, wherein the one or more processors operable to configure the first and second private network settings for the first and second NAT appliance instances are further operable to configure services on the first and second NAT appliance instances operable to provide host configuration services.

12. The system of claim 11, wherein the host configuration services comprise domain name system (DNS) and dynamic host configuration protocol (DHCP) services.

13. The system of claim 9, wherein the one or more processors operable to configure the first and second private network settings for the first and second NAT appliance instances are further operable to configure virtual private network (VPN) services on the first and second NAT appliance instances.

14. The system of claim 9, wherein the one or more processors operable to configure the first and second private network settings for the first and second NAT appliance instances are further operable to apply port forwarding rules.

15. The system of claim 9, wherein the one or more processors operable to configure the first and second private network settings for the first and second NAT appliance instances are further operable to configure firewall rules.

16. The system of claim 9, the one or more processors being further operable to:
receive an address from a host configuration server on the network; and
assign the address to the public network interface of one of the first and second NAT appliance instances generated from the NAT appliance template.

17. Logic encoded in a non-transitory computer-readable medium, the logic comprising instructions that when executed by a processor are operable to:
receive a first request to generate a first virtual machine environment;
generate the first virtual machine environment by cloning an environment template, the environment template comprising a first plurality of virtual machines comprising a web server image and a database server image;
receive a second request to generate a second virtual machine environment;
generate the second virtual machine environment by cloning the environment template;
wherein the environment template, the first virtual machine environment and the second virtual machine environment each comprise a common hostname;
configure first and second hostnames different from the common hostname, for first and second virtual NAT appliance instances, respectively;
configure first and second private network settings for the first and second virtual NAT appliance instances, respectively;
generate the first and second virtual NAT appliance instances from a NAT appliance template, the NAT appliance template comprising a public network interface and a private network interface;
logically deploy the first virtual NAT appliance between the first virtual machine environment and a network; and
logically deploy the second virtual NAT appliance between the second virtual machine environment and the network.

18. The logic of claim 17, further comprising instructions operable to generate a virtual switch, the virtual switch operable to facilitate communication between the first plurality of virtual machines and the first private network interface.

19. The logic of claim 17, wherein the instructions operable to configure the first and second private network settings for the first and second NAT appliance instances are further operable to configure services on the first and second NAT appliance instances operable to provide host configuration services.

20. The logic of claim 19, wherein the host configuration services comprise domain name system (DNS) and dynamic host configuration protocol (DHCP) services.

21. The logic of claim 17, wherein the instructions operable to configure the first and second private network settings for the first and second NAT appliance instances are further operable to apply port forwarding rules.

22. The logic of claim 17, wherein the instructions operable to configure the first and second private network settings for the first and second NAT appliance instances are further operable to configure firewall rules.

23. The logic of claim 17, further comprising instructions operable to:
receive an address from a host configuration server on the network; and
assign the address to the public network interface of one of the first and second NAT appliance instances generated from the NAT appliance template.

24. The method of claim 6, wherein each of the environment template, the first virtual machine environment and the second virtual machine environment comprise a common network address.

* * * * *